US009002259B2

(12) United States Patent
Morton

(10) Patent No.: US 9,002,259 B2
(45) Date of Patent: Apr. 7, 2015

(54) TRANSMISSION CHANNEL SUBSTITUTION

(75) Inventor: Daniel M Morton, Arlington, MA (US)

(73) Assignee: Bose Corporation, Framingham, MA (US)

( * ) Notice: Subject to any disclaimer, the term of this patent is extended or adjusted under 35 U.S.C. 154(b) by 559 days.

(21) Appl. No.: 12/855,956

(22) Filed: Aug. 13, 2010

(65) Prior Publication Data

US 2012/0040605 A1 Feb. 16, 2012

(51) Int. Cl.

| | |
|---|---|
| ***H04H 20/71*** | (2008.01) |
| ***H04H 20/74*** | (2008.01) |
| ***H04H 40/00*** | (2008.01) |
| ***H04B 7/00*** | (2006.01) |
| ***H04H 20/24*** | (2008.01) |
| *H04H 20/72* | (2008.01) |
| *H04H 20/82* | (2008.01) |

(52) U.S. Cl.

CPC ............... *H04H 20/24* (2013.01); *H04H 20/72* (2013.01); *H04H 20/82* (2013.01)

(58) Field of Classification Search

CPC ...................................................... H04H 60/48

USPC ............. 455/3.01, 3.04, 3.06, 66.1, 344, 345, 455/346

See application file for complete search history.

(56) References Cited

U.S. PATENT DOCUMENTS

| | | | | |
|---|---|---|---|---|
| 6,950,623 | B2 * | 9/2005 | Brown et al. | 455/3.01 |
| 6,968,018 | B2 * | 11/2005 | Ishii | 375/316 |
| 7,113,739 | B2 * | 9/2006 | Kawamata et al. | 455/3.02 |
| 7,212,781 | B2 * | 5/2007 | Hikomoto | 455/3.01 |
| 7,330,693 | B1 * | 2/2008 | Goss | 455/3.01 |
| 7,403,753 | B1 * | 7/2008 | Chan | 455/156.1 |
| 7,555,259 | B2 * | 6/2009 | Kawamata et al. | 455/3.02 |
| 7,599,685 | B2 * | 10/2009 | Goldberg et al. | 455/421 |
| 7,657,224 | B2 * | 2/2010 | Goldberg et al. | 455/3.06 |
| 7,697,939 | B2 * | 4/2010 | Wada et al. | 455/452.2 |
| 7,742,740 | B2 * | 6/2010 | Goldberg et al. | 455/11.1 |
| 7,835,689 | B2 * | 11/2010 | Goldberg et al. | 455/3.06 |
| 7,865,137 | B2 * | 1/2011 | Goldberg et al. | 455/11.1 |
| 7,916,877 | B2 * | 3/2011 | Goldberg et al. | 381/123 |
| 7,917,082 | B2 * | 3/2011 | Goldberg et al. | 455/3.06 |
| 8,010,068 | B1 * | 8/2011 | Chan | 455/150.1 |
| 8,103,231 | B1 * | 1/2012 | Chan | 455/150.1 |
| 8,219,134 | B2 * | 7/2012 | Maharajh et al. | 455/519 |
| 8,387,083 | B1 * | 2/2013 | Prasad | 725/14 |
| 2002/0068525 | A1 * | 6/2002 | Brown et al. | 455/3.01 |
| 2003/0054758 | A1 * | 3/2003 | Kawamata et al. | 455/3.04 |
| 2003/0129941 | A1 * | 7/2003 | Kawamata et al. | 455/3.02 |
| 2007/0010192 | A1 * | 1/2007 | Kawamata et al. | 455/3.02 |

(Continued)

OTHER PUBLICATIONS

"About Radio Time". Retrieved Aug. 12, 2010 from http://inside.radiotime.com/about , 2 pages.

(Continued)

*Primary Examiner* — Tilahun B Gesesse

(74) *Attorney, Agent, or Firm* — Brian M. Dingman; Dingman, McImes & McLane, LLP

(57) ABSTRACT

Systems, methods, apparatuses, and computer program products for receiving an identifier of a first transmission channel for a first media station, determining whether content of the first media station is available via a second transmission channel for the first media station, and automatically initiating transmission of content of a second media station to a client computing device over a transmission channel for the second media station based on results of the determining.

26 Claims, 7 Drawing Sheets

(56) References Cited

U.S. PATENT DOCUMENTS

| | | | | |
|---|---|---|---|---|
| 2007/0129004 | A1* | 6/2007 | Goldberg et al. | 455/3.06 |
| 2007/0129005 | A1* | 6/2007 | Goldberg et al. | 455/3.06 |
| 2007/0129006 | A1* | 6/2007 | Goldberg et al. | 455/3.06 |
| 2007/0155312 | A1* | 7/2007 | Goldberg et al. | 455/3.06 |
| 2007/0155313 | A1* | 7/2007 | Goldberg et al. | 455/3.06 |
| 2010/0333137 | A1* | 12/2010 | Hamano et al. | 725/39 |

OTHER PUBLICATIONS

"Why Radio Time, Why You Want to Work with Radio Time". Retrieved Aug. 12, 2010 from http://inside.radiotime.com/about/why-radiottime , 3 pages.

"RadioTime Home Page Tour" Retrieved Aug. 12, 2010 from http://wiki.radiotime.com/doku.php?is=tours:home , 7 pages.

"Station Page Tour" Retrieved Aug. 12, 2010 from http://wiki.radiotime.com/doku.php?id=tours:station , 2 pages.

"Program Details Tour" Retrieved Aug. 12, 2010 from http://wiki.radiotime.com/doku.php?id=tours:program , 3 pages.

"Tour RedButton" Retrieved Aug. 12, 2010 from http://wiki.radiotime.com/doku.php?id=tours:redbutton , 4 pages.

"Searching and Browsing RadioTime" Retrieved Aug. 12, 2010 from http://wiki.radiotime.com/doku.php?id-help:searching__and__browsing__radiotime , 3 pages.

"Top 10 Questions" Retrieved Aug. 12, 2010 from http://wiki.radiotime.com/doku.php?id=help:top__10__questions , 2 pages.

"Presets, Local, and My Info" Retrieved Aug. 12, 2010 from http://wiki.radiotime.com/doku.php?id=help:my__info__and__customization , 4 pages.

"This isn't working! Troubleshooting problems" Retrieved Aug. 12, 2010 from http://wiki.radiotime.com/doku.php?id=help:troubleshooting , 2 pages.

"Boston Radio Stations—Listen Online" Retrieved Aug. 12, 2010 from http://radiotime.com/region/c__100009/Boston.aspx , 5 pages.

"WRPS—88.3 FM Rockland, MA" Retrieved Aug. 12, 2010 from http://radiotime.com/station/s__22554/WRPS__883.aspx , 1 page.

"About vTuner" Retrieved Aug. 12, 2010 from http://www.vtuner.com/index.php?id=144 , 4 pages.

"Our Services" Retrieved Aug. 12, 2010 from http://vturner.com/index.php?id=148 , 2 pages.

"Unlimited radio on your iPhone and iPod Touch—vTuner launches vTuner radio app with more than 7,000 stations from more than 120 countries." Retrieved Aug. 12, 2010 from http://www.vtuner.com/index.php?id=143 , 2 pages.

* cited by examiner

TRANSMISSION CHANNEL SUBSTITUTION

BACKGROUND

This description relates to transmission channel substitution.

Media broadcasts, including radio and television broadcasts, are often available over-the-air via terrestrial or satellite transmission channels in their local markets as well as over the public Internet via packet switched transmission channels. A user may tune a conventional amplitude modulation (AM) radio to a specific frequency in the 530 kHz to 1700 kHz range or a conventional frequency modulation (FM) radio to a specific frequency in the 88 to 108 MHz tuning range (these ranges are used in the United States; other countries may have different ranges) for reception of a media broadcast in analog or digital format (e.g., HD Radio). Alternatively, the user may enter a Universal Resource Locator (URL) into a web browser of an Internet-enabled device (e.g., laptop, desktop, smartphone, and tablet computer) to access a live data stream of a media broadcast that has been made available on the public Internet by a media station. In yet another alternative, the user may access a live data stream of a media broadcast through a series of menu selections displayed on a user interface of a dedicated internet radio hardware device.

SUMMARY

In general, in one aspect, the invention features a computer program product, tangibly embodied on a computer readable medium, including instructions, which when executed by a first computing device, cause the first computing device to receive content over a first transmission channel for a first media station, determine whether transmission quality of the received content satisfies a set of criteria, and based on results of the determination, perform at least one of the following without requiring input to be received through a user interface of the first computing device: initiate reception of content over a second transmission channel for the first media station; and initiate reception of content over a transmission channel for a second media station.

Implementations of the invention may include one or more of the following features.

The instructions to initiate reception of content over the second transmission channel for the first media station or the transmission channel for the second media station may include instructions, which when executed by the first computing device, cause the first computing device to communicate a content request message including an identifier of the first transmission channel for the first media station to a second computing device.

The computer program product may further include instructions, which when executed by the first computing device, cause the first computing device t: receive, through a user interface of the first computing device, an identifier of the first transmission channel for the first media station, and initiate reception of the content over the first transmission channel for the first media station.

The computer program product may further include instructions, which when executed by the first computing device, cause the first computing device to provide, on a user interface of the first computing device, a visual representation of a radio receiver tuning interface, simulate a tuning of a radio receiver to a broadcast frequency responsive to input received via the user interface of the first computing device, and designate the broadcast frequency as the identifier of the first transmission channel for the first media station.

Each of the first transmission channel for the first media station, the second transmission channel for the first media station, and the transmission channel for the second media station may be one of a carrier wave channel on which the content of a media station is modulated using at least one of a digital modulation technique, an amplitude modulation technique, and a frequency modulation technique, and a packet switched channel on which content of a media station is transmitted using at least one of a connectionless protocol and a connection-oriented protocol.

The computer program product may further include instructions, which when executed by the first computing device, cause the first computing device to communicate a station request message including location information of the first computing device to a second computing device.

The computer program product may further include instructions, which when executed by the first computing device, cause the first computing device to process a station response message received from a second computing device, the station response message including a set of transmission channel identifiers, and provide, on a user interface of the first computing device, a visual representation of the set of transmission channel identifiers.

In another aspect, the invention features an apparatus that includes a processor, and a memory configured to store instructions of a computer program product, which when executed by the processor, cause the processor to receive an identifier of a first transmission channel for a first media station, determine whether content of the first media station is available via a second transmission channel for the first media station, and based on results of the determination, automatically initiate transmission of content of a second media station to a computing device over a transmission channel for the second media station.

In another aspect, the invention features an apparatus that includes a processor, and a memory configured to store instructions of a computer program product, which when executed by the processor, cause the processor to receive content over a first transmission channel for a first media station, determine whether transmission quality of the received content satisfies a set of criteria, and based on results of the determination, perform at least one of the following without requiring input to be received through a user interface of the apparatus initiate reception of content over a second transmission channel for the first media station, and initiate reception of content over a transmission channel for a second media station.

In another aspect, the invention features a communication system that includes a server computing device including a processor and a memory configured to store instructions of a computer program product, which when executed by the processor of the server computing device, cause the processor to receive from a client computing device a request to download a client application, initiate an establishment of a communication channel between the client computing device and a data store of applications, and cause the client application to be downloaded to a memory of the client computing device for storage, wherein the client application includes instructions, which when executed by a processor, cause the processor to receive content over a first transmission channel for a first media station, determine whether transmission quality of the received content satisfies a set of criteria, and based on results of the determination, perform at least one of the following without requiring input to be received through a user interface of the first computing device initiate reception of content over a second transmission channel for the first media station, and initiate reception of content over a transmission channel for a second media station.

Other features and advantages of the invention are apparent from the following description, and from the claims.

DESCRIPTION

Generally, in this description, we describe a client application that, when executed on a client computing device, allows a user to selectively "tune" the device to a first transmission channel for a first media station, and: (i) receive content of the first media station via the first transmission channel for the first media station; (ii) receive content of the first media station via a second transmission channel for the first media station; or (iii) receive content of a second media station via a transmission channel for the second media station. The determination as to which transmission channel the client computing device receives content over, and/or which media station's content is received by the client computing device, is made without requiring input from the user subsequent to the initial "tuning" of the client computing device. This determination may be performed by the client application or a server application as described in more detail below with reference to different example scenarios, and different types of client computing devices on which the client application may be loaded and run.

1 Portable Multifunction Device with Tuner

Figure 1:
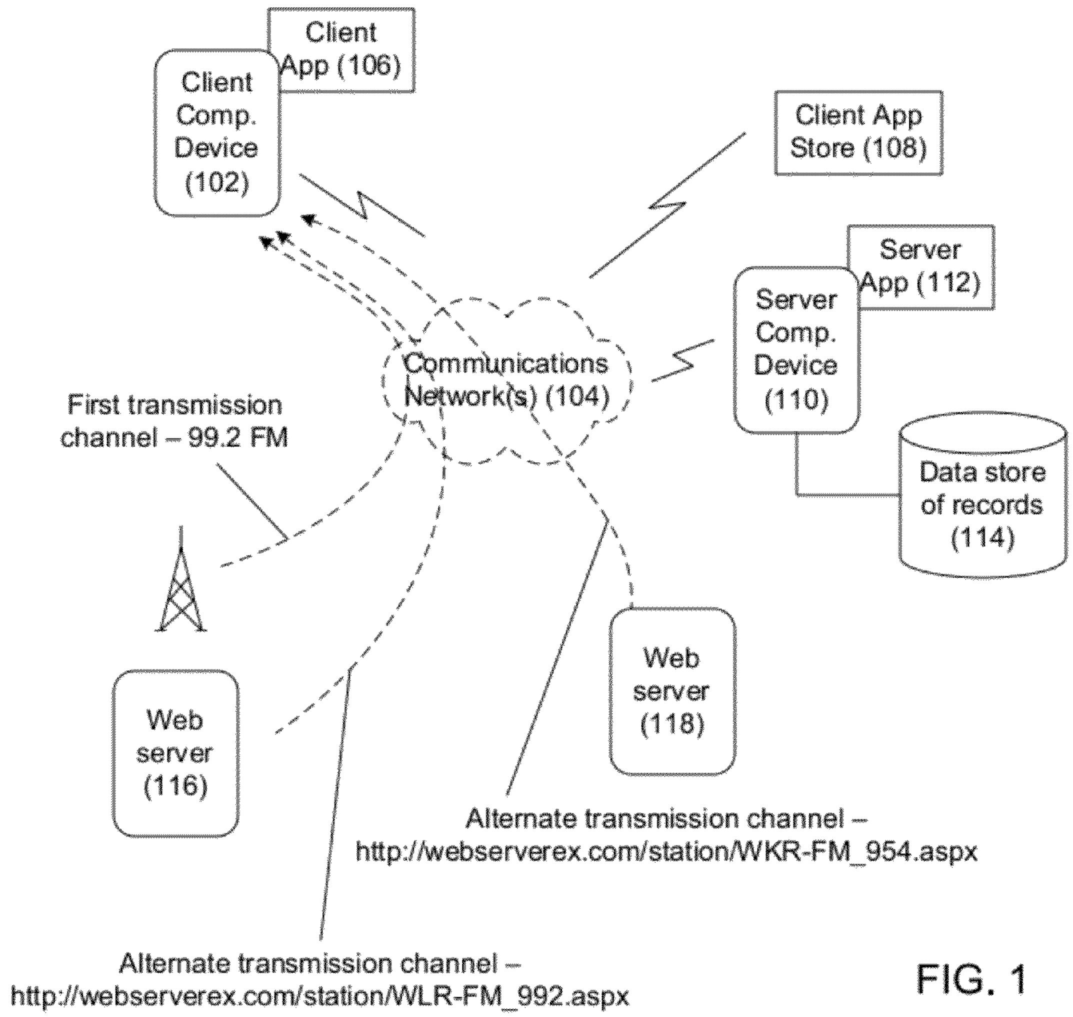
FIGS. 1 and 7 each show a communication system.

Referring to FIG. 1, in one example, a client computing device 102 is a portable multifunction device that includes a radio tuner (e.g., radio tuner circuitry) and associated circuitry operable to convert signals received over one or more communications networks 104 into audio signals suitable for output by speakers of the client computing device. The communications networks 104 may use any of a plurality of wireless communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), and Wi-MAX, or wired communication standards, protocols and technologies, including but not limited to digital subscriber line (DSL), Ethernet, cable, phone line, or power line.

In addition to the radio tuner and associated circuitry, the client computing device 102 also includes a processor, and a memory on which a client application 106 may be preloaded or stored following an over-the-air download of the client application 106 from a client application store 108 on the Internet.

Figure 2:
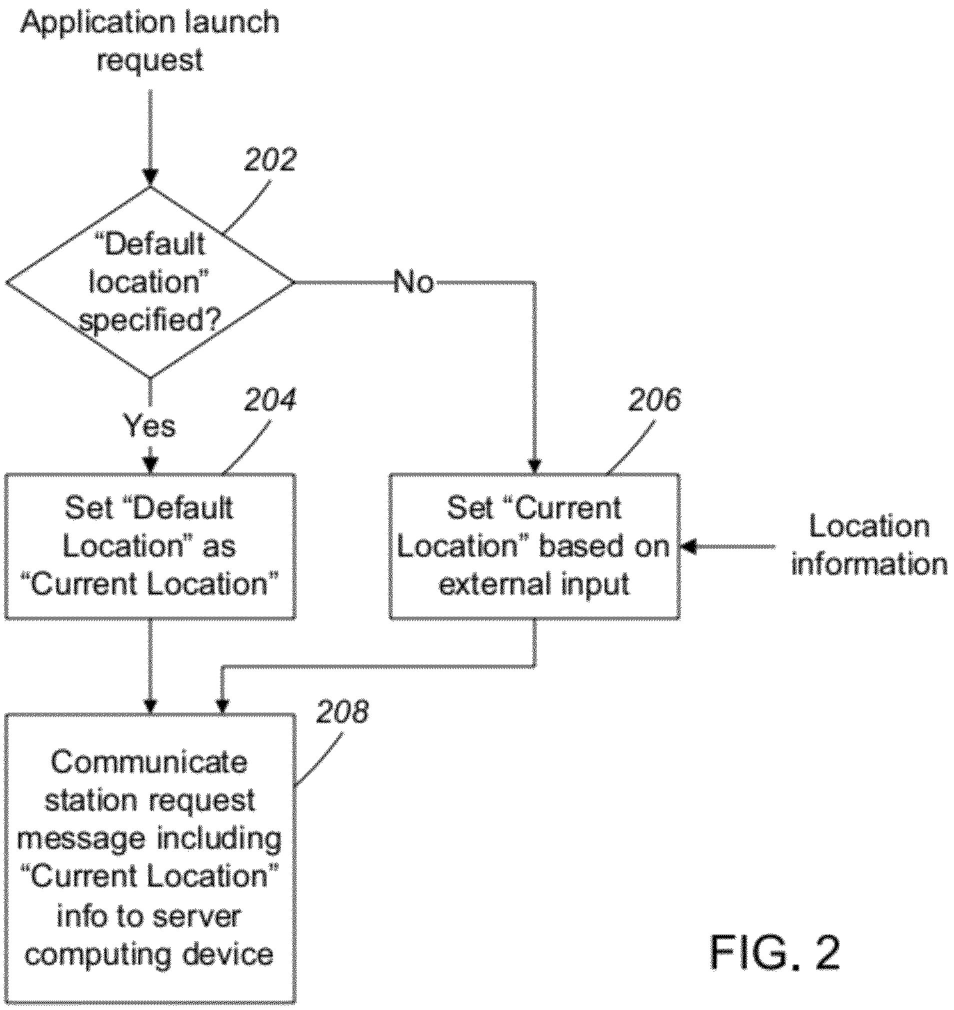
FIGS. 2-4 and 6 each show a flowchart associated with a transmission channel substitution process.

Referring also to FIG. 2, the client application 106 is launched responsive to receipt of a user input through a user interface of the client computing device 102. As an example, the user may launch the client application 106 by tapping on a client application widget displayed on a touch screen interface of the client computing device 102. In other examples, the client application 106 may be launched via a spoken command interface.

Upon launch, the client application 106 examines its application preferences to determine (202) whether a "Default Location" has been specified for the client computing device 102. If one has been specified, the client application 106 sets (204) the "Default Location" as the "Current Location" of the client computing device 102. If one has not been specified, the client application 106 sets (206) the "Current Location" based on external input. For example, the client application 106 may be implemented to obtain location information from a GPS module of the client computing device 102 upon launch and automatically set the latitude and longitude information provided by the GPS module as the "Current Location" for the client computing device 102. In other examples, the client application 106 may be implemented to obtain location information from the GPS module only in those instances in which a "Default Location" has not been specified. In some implementations, the client application 106 provides an interface through which the user may enter "Current Location" information by US ZIP code, latitude/longitude, city/state/country, etc. The user may enter the current physical location of the client computing device or a preferred virtual location of the client computing device, for example, based on the user's city of residence when the user is travelling with the client computing device in different locations.

Once the "Current Location" information has been set, the client application 106 generates a station request message that includes the current location of the client computing device, and communicates (208) the station request message to a server computing device 110 over the communications network 104.

Figure 3:
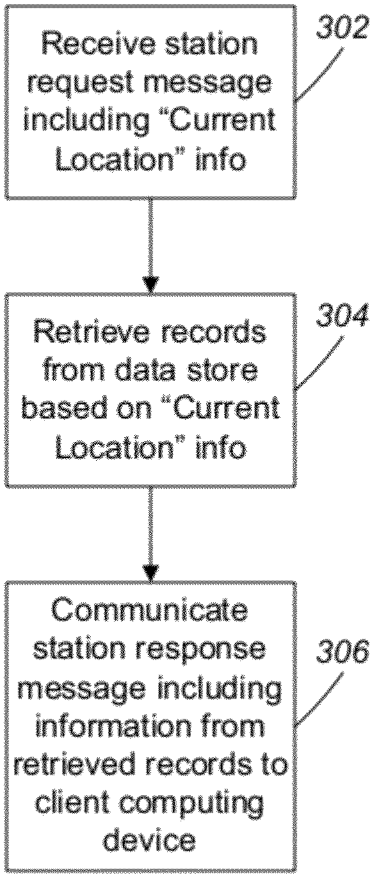

Referring also to FIG. 3, following receipt (302) of the station request message, a server application 112 on the server computing device 110 processes the station request message to extract the "Current Location" information, and uses the extracted information to retrieve (304), from a data store of records, the records for media stations servicing the current location of the client computing device from a data store of records 114. Such a data store of records 114 may include records for each of a set of radio stations, for example, all radio stations in the United States, including terrestrial-based radio stations, internet-based radio stations, and satellite-based radio stations. In one example, each record includes the broadcast frequency of a radio station, its call letters, city of license, broadcast area, language, genre classification, and URL (if any).

The server application 112 packages information included in each of the retrieved records into a station response message that is communicated (306) to the client computing device. In some implementations, the information packaged in the station response message includes identifiers of a common transmission channel and corresponding media station call letters.

Figure 4:
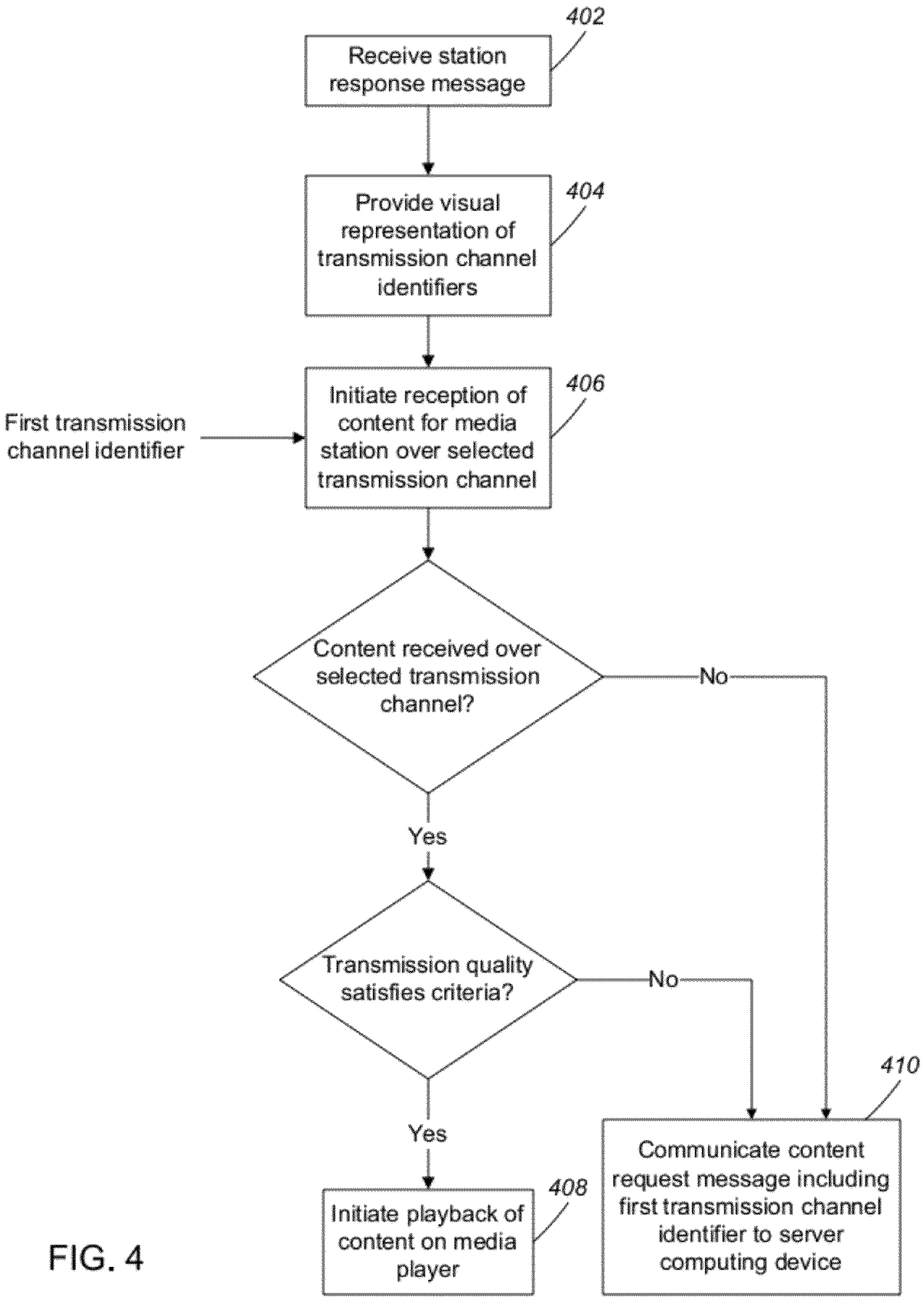

Referring also to FIG. 4, following receipt (402) of the station response message, the client application 106 on the client computing device 102 extracts the information packaged in the station response message and causes (404) a visual representation of a set of transmission channel identifiers, each corresponding to a media station whose broadcast area includes the "Current Location" of the client computing device, to be displayed on the display screen of the client computing device 102.

Figure 5B:
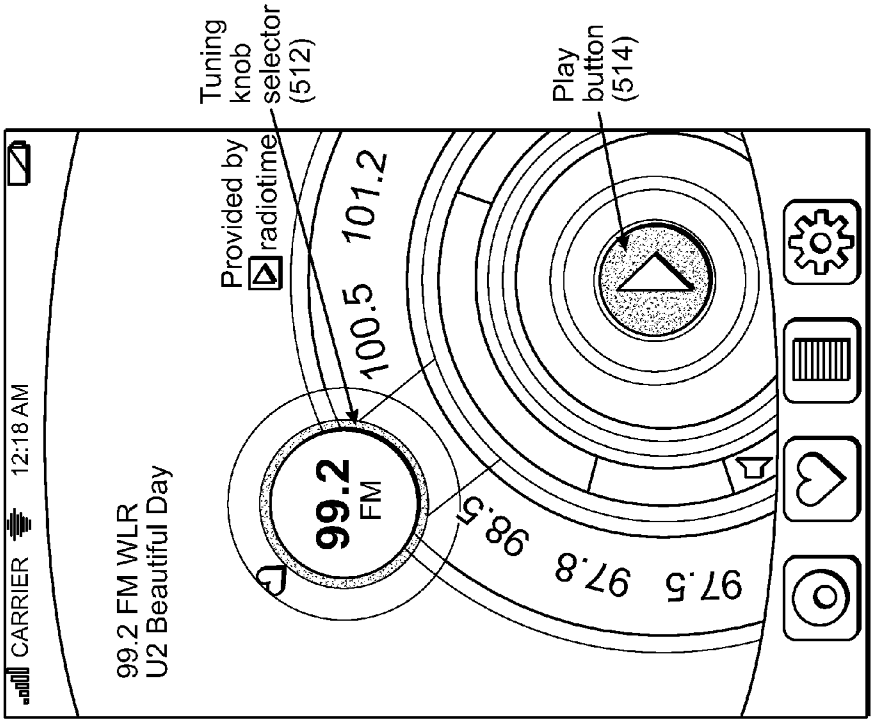
FIGS. 5*a* and 5*b* each show a radio receiver tuning interface of a client computing device.
Figure 5A:
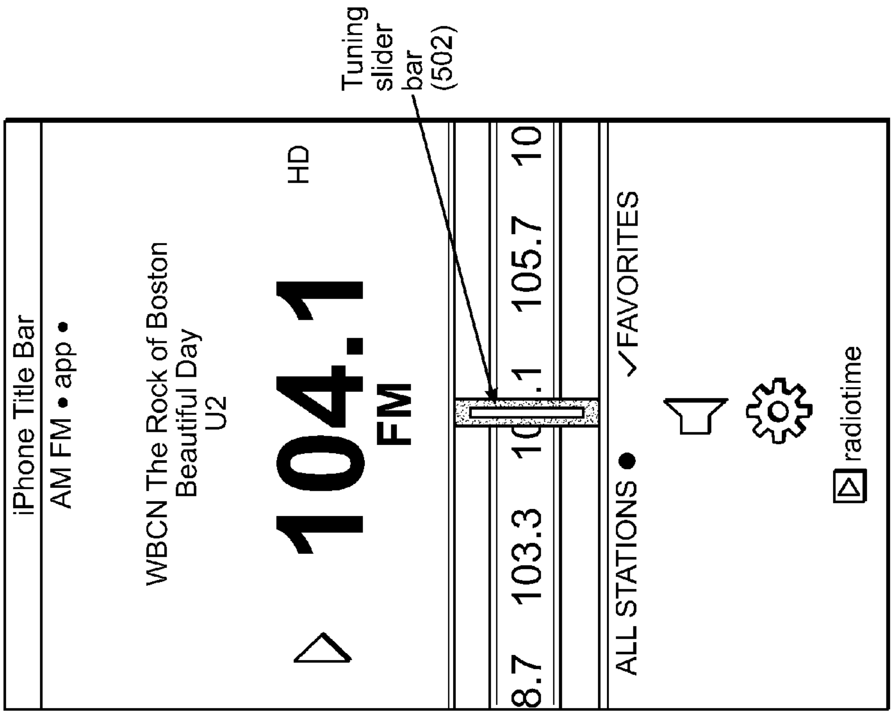

One example of a visual representation of a radio receiving tuning interface is shown in FIG. 5*a*. A virtual tuning slider bar 502 can be moved (e.g., responsive to contact on the display screen of a finger) along the length of a virtual radio dial. In one implementation, if the virtual tuning slider bar remains on a particular transmission channel identifier for more than a predefined amount of time (e.g., 1 second), the client application 106 identifies the media station (e.g., WBCN) associated with the transmission channel identifier as the user's desired media station and initiates (406) a reception of content of the user's desired media station over a first transmission channel (e.g., FM carrier wave channel) by tuning the radio tuner of the client computing device 102 to the highlighted broadcast frequency (e.g., 104.1 FM).

Another example of a visual representation of a radio receiving tuning interface is shown in FIG. 5*b*. A virtual tuning knob can be moved (e.g., responsive to contact on the display screen of a finger) in a clockwise or counter-clockwise direction within a predetermined range of angles corresponding to a tuning range (e.g., the 88 to 108 MHz tuning range) to highlight a transmission channel identifier. In the depicted example of FIG. 5*b*, the transmission channel identifier (e.g., 99.2 FM) that is visually highlighted by the tuning knob's selector 512 when the user taps on the play button 514 is considered by the client application 106 as the identifier of a first transmission channel (e.g., FM carrier wave channel) of the user's desired media station (e.g., WLR). In one implementation, responsive to the tapping of the play button, the client application 106 first initiates a reception of content of the user's desired media station (e.g., WLR) over the first transmission channel (e.g., FM carrier wave channel) by tuning the radio tuner of the client computing device 102 to the highlighted broadcast frequency (e.g., 99.2 FM).

If the transmission quality of the content received over the first transmission channel is of sufficient quality, the client application 106 initiates (408) playback of the received content on a media player of the client computing device 102.

If no content is received over the first transmission channel following the tuning, or the transmission quality of the content received over the first transmission channel is of insufficient quality, the client application 106 communicates (410) a content request message including the first transmission channel identifier (e.g., 99.2 FM) to a server computing device 110 over the communications network 104. In some implementations, the client application 106 provides on the display screen of the client computing device 102 a visual indicator (e.g., text-based and/or graphical-based) that content of the user's desired media station is being sought over an alternate transmission channel.

Figure 6:
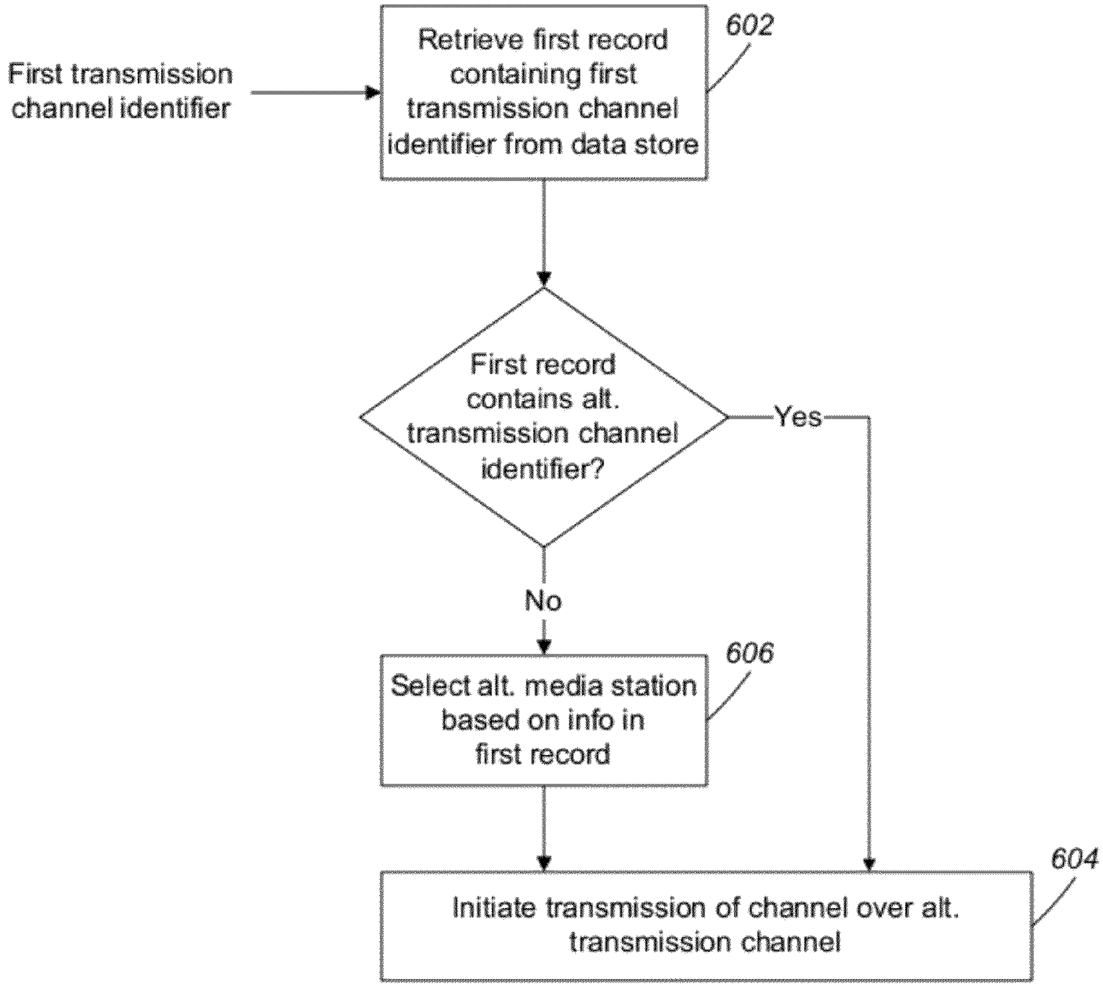

Referring also to FIG. 6, following receipt of the content request message, a server application 112 on the server computing device 110 processes the content request message to extract the first transmission channel identifier, and uses the extracted information to retrieve (602), from the data store of records, the record containing the first transmission channel identifier (e.g., 99.2 FM).

If the retrieved record includes at least one alternate transmission channel identifier (e.g., http://webserverex.com/station/WBCN-FM__1041.aspx), the server application 112 initiates (604) a transmission of content for the user's desired media station to the client computing device 102 over a transmission channel associated with the alternate transmission channel identifier (e.g., http://webserverex.com/station/WBCN-FM104.1.aspx for a web server 116) without requiring any further input to be received from client computing device 102.

If, however, the retrieved record does not include at least one alternate transmission channel identifier, the server application uses the information included in the retrieved record to identify further records to be retrieved from the data store of records and selects (606) an alternate media station. For example, the server application may determine, based on the language and genre classification information in the retrieved record, that the user's desired media station is an English language station belonging to the "Modern Rock" genre classification. The server computing device may use such information to filter the records in the data store of records and retrieve a record for a media station that shares some or all of the characteristics of the user's desired media station. In those instances in which multiple records of the data store of records share some or all of the characteristics of the user's desired media station, a variety of filtering criteria could be used, for example, based on finer-grain genre information, based on broadcast corporation affiliation (e.g., "ABC"), based on geographic location (e.g., preferring stations that are closer than those that are far away from the current location of the portable multifunction device), or based on specific programming (e.g., determining the program being played on the user's desired station based on a program guide, such as "America's Top 40," and determining which station matches that program or a program, with similar characteristics).

Once the selection of an alternate media station is made, the server application 112 initiates (604) a transmission of content for the alternate media station to the client computing device 102 over a transmission channel associated with the alternate media station (e.g., http://webserverex.com/station/WKR-FM__954.aspx for a web server 118) without requiring any further input to be received from the client computing device. In some implementations, the client application 106 provides on the display screen of the client computing device 102 a visual indicator (e.g., displaying the broadcast frequency and/or call letters of the alternate media station) that content is being received from the alternate media station.

The server application may be implemented to initiate a transmission of content to the client computing device simply by sending the client application the appropriate transmission channel identifier.

2 Head Unit of Audio Automotive System with Tuner

In another example, a client computing device is a head unit of an automotive audio system. The head unit includes a processor, and a memory on which a client application and a data store of records may be stored. The client application may be pre-stored in the memory of the head unit prior to installation, or downloaded over-the-air from a client application store on the Internet. Information forming the data store of records may be periodically refreshed (e.g., through over-the-air updates) so that current information is made available to the client application at all times.

A user launches the client application on demand by selectively entering input commands through a user interface of the head unit. In some implementations, the input commands are received via one or more physical buttons located on a front plate of the head unit. In other implementations, the input commands are received through a user navigation of menu options provided on a display screen of the head unit.

In a manner similar to that described above with reference to the portable multifunction device example, a "Current Location" of the head unit is set and a visual representation of a set of transmission channel identifiers is displayed on a display screen of the head unit.

Upon receipt of input from the user selecting one of the displayed transmission channel identifiers (e.g., 90.9 FM), the client application initiates reception of content over a transmission channel (e.g., FM carrier wave channel) associated with the user-selected media station (e.g., WBUR), and initiates playback of the received content on the automotive audio system. The client application may be implemented to monitor the signal strength of the signals carrying the content of the user-selected media station and automatically perform a transmission channel substitution upon determination that the signal strength has fallen below a predetermined threshold.

In one implementation, to effect a transmission channel substitution, the client application first retrieves, from the data store of records within the memory of the head unit, the record corresponding to the user-selected media station (e.g., WBUR). If the retrieved record includes at least one alternate transmission channel identifier (e.g., an identifier for a satellite feed of the content of the user-selected media station), the client application may be configured to initiate a transmission of content for the user's desired media station to the head unit over a transmission channel associated with the alternate transmission channel identifier without requiring any further input to be received from the user.

If, however, the retrieved record does not include at least one alternate transmission channel identifier, the client application uses the information included in the retrieved record to identify further records to be retrieved from the data store of records within the memory of the head unit. For example, the client application may determine based on a program guide (e.g., stored in the memory of the head unit) that the program being played on the user-selected media station is "Car Talk." The client application may filter the records in the data store to identify a set of records each corresponding to a media station that is currently broadcasting the "Car Talk" program, and further filter the set of records based on geographic location (e.g., selecting the media station that is closest to the current location of the head unit as the alternate source).

Once the selection of an alternate media station is made, the client application may be configured to initiate a reception of content for the alternate media station to the head unit of the automotive audio system over a transmission channel associated with the alternate media station (e.g., Sirius channel 134, 88.5 FM, http://webserverex.com/station/WFCR-FM_885.aspx) without requiring any further input from the user.

3 Portable Multifunction Device without Tuner

Figure 7:
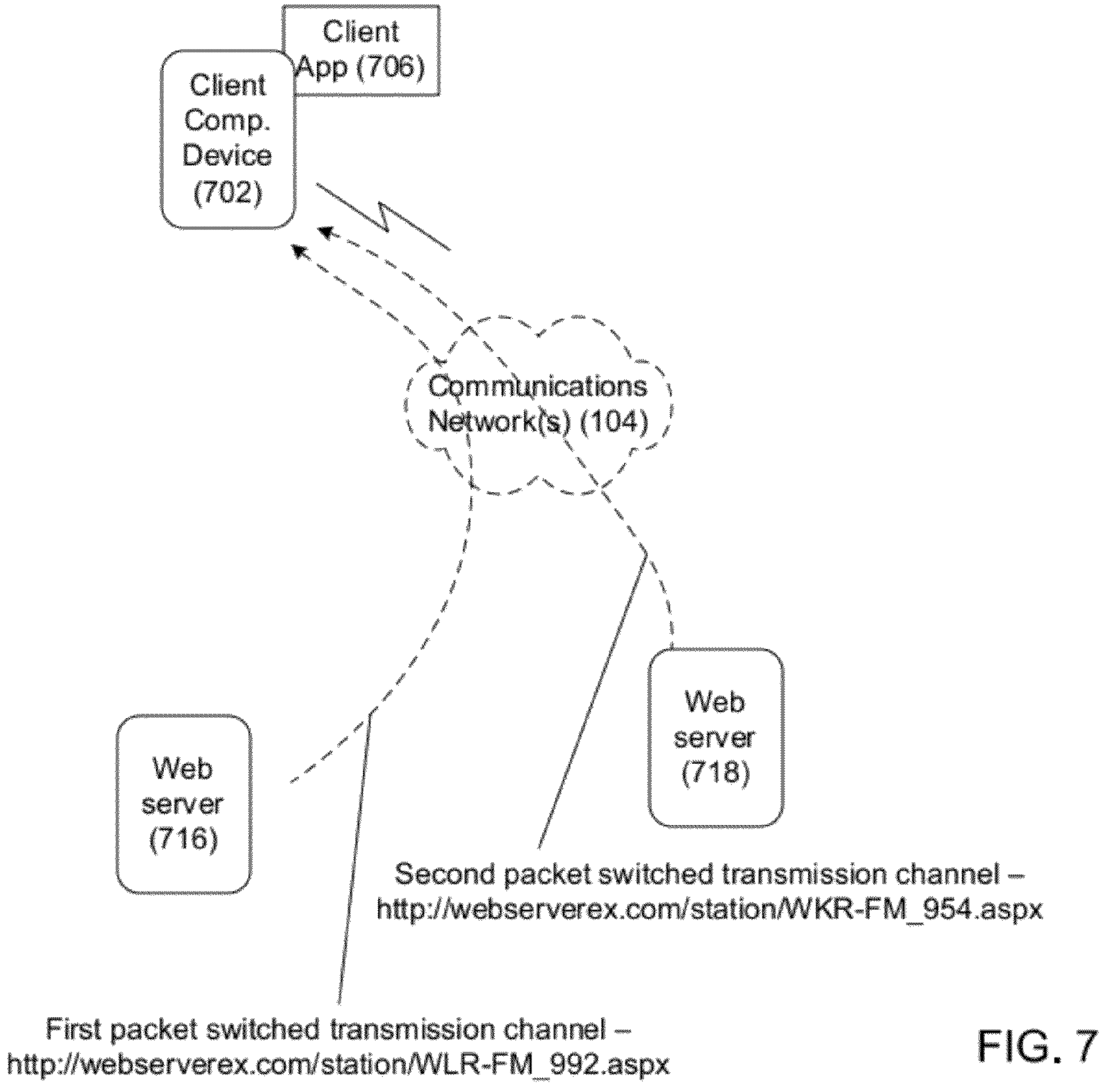

Although the examples above are described in the context of devices with built-in radio tuners, the techniques are also applicable in the context of tuner-free devices. Referring to FIG. 7, in one example, a client computing device 702 is a tuner-free portable multifunction device that includes circuitry operable to convert signals received over a wired and/or wireless communications networks 704 into audio signals suitable for output by speakers of the client computing device. Once launched, a client application 706 stored in a memory of the client computing device 702 may provide a visual representation of a simulated radio tuner interface (including packet switched transmission channel identifiers and optionally carrier wave transmission channel identifiers) through which a user selects a first packet switched transmission channel identifier. If content cannot be received from a first web server 716 over the first packet switched transmission channel (e.g., due to IP address blocking or a web server connection overload) or the transmission quality of the content received over the first packet switched transmission channel is poor, the client application 706 automatically substitutes the first packet switched transmission channel with another, e.g., a second packet switched transmission channel associated with a media station that shares similar characteristics (e.g., in terms of programming, language, genre classification, broadcast area) with the media station that is associated with the first packet switched transmission channel identifier, and initiates a reception of content from a second web server 718.

4 Other Examples and Implementations

Although the examples above are described in the context of audio-based media broadcasts, the techniques are also applicable in the context of video-based media broadcasts. For example, a client application may be loaded and run from a memory of an Internet-enabled television set or an Internet-enabled dedicated hardware device that is a component of a home entertainment system.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A manufacture comprising a non-transitory computer-readable medium having encoded thereon a computer-program product, said computer-program product comprising instructions for causing a computing device to receive a plurality of content request messages requesting the delivery of media content, instructions for causing said computing device to select, from among said messages, a selected message, said selected message containing an identifier of a first media content delivery transmission channel associated with a first media station, instructions for causing said computing device to determine that media content of said first media station is available to be delivered via an alternate media content delivery transmission channel that is different than the first media content delivery transmission channel, and instructions for causing said computing device to automatically initiate transmission of media content of said first media station over said alternate media content delivery transmission channel.

2. The manufacture of claim 1, wherein said instructions comprise instructions for causing said computing device to select, as said alternate media content delivery transmission channel, a second media content delivery transmission channel associated with said first media station, where the second media content delivery transmission channel is different than the first media content delivery transmission channel.

3. The manufacture of claim 1, wherein said instructions comprise instructions for causing said computing device to select, as said alternate media content delivery transmission channel, a media content delivery transmission channel associated with a second media station that is different than said first media station.

4. The manufacture of claim 3, wherein said second media station is selected based on similarity between programming of said first media station and programming of said second media station.

5. The manufacture of claim 1, wherein said identifier of a first media content delivery transmission channel associated with a first media station comprises a value within a range of acceptable values, each of which represents a broadcast frequency.

6. The manufacture of claim 1, wherein said identifier of a first media content delivery transmission channel associated with a first media station comprises a sequence of alphanumeric characters representative of a media station call sign.

7. The manufacture of claim 1, wherein said first media content delivery transmission channel associated with a first media station is a channel that carries a carrier wave that carries a signal representative of media content provided by said first media station, wherein said media content has been modulated to be carried on said carrier wave, and wherein said alternate media content delivery transmission channel comprises a packet-switched channel.

8. The manufacture of claim 7, wherein said packet-switched channel is a channel that carries data packets according to a connection-oriented protocol.

9. The manufacture of claim 7, wherein said packet-switched channel is a channel that carries data packets according to a connectionless protocol.

10. The manufacture of claim 7, wherein said first media content delivery transmission channel associated with a first media station carries a signal that has been modulated to have a time-varying amplitude, said time-varying amplitude being indicative of said media content.

11. The manufacture of claim 7, wherein said first media content delivery transmission channel associated with a first media station carries a signal that has been modulated to have a time-varying frequency, said time-varying frequency being indicative of said media content.

12. The manufacture of claim 7, wherein said first media content delivery transmission channel associated with a first media station carries a signal that has been digitally modulated.

13. The manufacture of claim 1, further comprising instructions that, when executed by said computing device, cause said computing device to select said alternate media content delivery transmission channel based at least in part on information concerning said first media station.

14. The manufacture of claim 1, further comprising instructions that, when executed by said computing device, cause said computing device to select said alternate media content delivery transmission channel based at least in part on programming being broadcast by said first media station.

15. The manufacture of claim 1, further comprising instructions that, when executed by said computing device, cause said computing device to select said alternate media content delivery transmission channel based at least in part on user preferences of a client.

16. The manufacture of claim 1, further comprising instructions that, when executed by said computing device, cause said computing device to select said alternate media content delivery transmission channel based at least in part on information concerning a location of a client.

17. The manufacture of claim 1, further comprising instructions that, when executed by said computing device, cause said computing device to select said alternate media content delivery transmission channel by identifying, from a plurality of media stations, a set of media stations, each of which has a characteristic of said first media station, and to select said alternate media content delivery transmission channel to be a channel associated with one of said media stations in said set of media stations.

18. A manufacture comprising a non-transitory computer-readable medium having a computer-program product encoded thereon, said product comprising instructions for causing a first computing device to receive media content over a first media content delivery transmission channel associated with a first media station, instructions for causing said first computing device to determine that said received media content has inadequate transmission quality, and instructions for causing said first computing device to, without requiring input to be received through a user interface of said first computing device, initiate reception of media content of said first media station over an alternate media content delivery transmission channel that is different than the first media content delivery transmission channel.

19. The manufacture of claim 18, wherein said instructions for causing said first computing device to initiate reception of media content over an alternate media content delivery transmission channel comprise instructions for sending to a second computing device a content request message that requests the delivery of media content, wherein said content request message comprises an identifier of said first media content delivery transmission channel.

20. The manufacture of claim 18, wherein said computer-program product further comprises instructions that, when executed by said first computing device, cause said first computing device to receive, through a user interface of said first computing device, an identifier of said first media content delivery transmission channel for said first media station, and to initiate reception of said media content over said first media content delivery transmission channel for said first media station.

21. The manufacture of claim 18, wherein said instructions further comprise instructions for causing said first computing device to provide, on a user-interface of said first computing device, a visual representation of a radio receiver tuning interface, to simulate a tuning of a radio receiver to a broadcast frequency responsive to input received via said user interface of said first computing device, and to designate said broadcast frequency as an identifier of said first media content deli very transmission channel for said first media station.

22. The manufacture of claim 18, wherein said instructions further comprise instructions that when executed by said first computing device, cause said first computing device to communicate a station request message to a second computing device, wherein said station request message comprises information indicative of a location of said first computing device.

23. The manufacture of claim 22, further comprising instructions, which when executed by the first computing device, cause the first computing device to process a station response message received from a second computing device, the station response message including a set of media content delivery transmission channel identifiers, and provide, on a user interface of the first computing device, a visual representation of the set of media content delivery transmission channel identifiers.

24. An apparatus comprising a first computing device, said first computing device comprising a processor and a memory configured to store a computer-program product on a non-transitory computer-readable medium, said computer-program product comprising instructions for causing said first computing device to receive, from a plurality of clients, content request messages requesting the delivery of media content, instructions for causing said first computing device to select, from among said messages, a selected message from a selected client, said selected message containing an identifier of a first media content delivery transmission channel associated with a first media station, instructions for causing said first computing device to determine that media content of the first media station is available to be delivered via an alternate media content delivery transmission channel that is different than the first media content delivery transmission channel, and instructions for causing said first computing device to automatically initiate transmission of media content of said first media station to said selected client over said alternate media content delivery transmission channel.

25. An apparatus comprising a computing device comprising a processor and a memory configured to store a computer program product, said computer program product comprising instructions for causing said computing device to receive media content over a first media content delivery transmission channel for a first media station, instructions for causing said computing device to determine that transmission quality of said received media content is inadequate, and instructions for causing said computing device to automatically initiate reception of media content of said first media station over an alternate media content delivery transmission channel that is different than said first media content delivery transmission channel.

26. An apparatus comprising a communication system, said communication system comprising a server comprising a processor and a memory configured to store a computer program product, said computer program product comprising instructions that, when executed by said processor, cause said server to receive, from a client computing device, a request to download a client application, to initiate establishment of a communication channel between said client computing device and a data store of applications, and cause said client application to be downloaded to a memory of said client computing device for storage, wherein said client application includes instructions that cause said client computing device to receive media content over a first media content delivery transmission channel for a first media station, instructions that cause said client computing device to determine that transmission quality of the received media content is inadequate, and instructions that cause said client computing device to automatically initiate reception of media content of said first media station over an alternate media content delivery transmission channel that is different than said first media content delivery transmission channel.

* * * * *